United States Patent [19]

Sekiguchi

[11] 3,861,620

[45] Jan. 21, 1975

[54] ONE STEP REWINDING SYSTEM FOR MAGNETIC TAPE RECORDERS AND REPRODUCERS

[75] Inventor: Sanji Sekiguchi, Sakado, Japan

[73] Assignee: Tokyo Denshi Kabushiki Kaisha, Saitama Prefecture, Japan

[22] Filed: Jan. 2, 1973

[21] Appl. No.: 320,194

[30] Foreign Application Priority Data

June 30, 1972 Japan .............................. 47-65028

[52] U.S. Cl. ................................ 242/189, 242/201

[51] Int. Cl. ...................... G11b 15/44, G11b 15/30

[58] Field of Search .......... 242/190, 189, 201, 202, 242/203, 204, 205, 186, 188, 210; 274/4 C, 4 D, 11 C

[56] References Cited

UNITED STATES PATENTS

| | | | |
|---|---|---|---|
| 2,676,212 | 4/1954 | Williams | 242/201 |
| 3,070,321 | 12/1962 | Bara | 242/189 |
| 3,092,296 | 6/1963 | Andrews | 242/189 |
| R27,229 | 11/1971 | Mitchell et al. | 242/189 |

*Primary Examiner*—George F. Mautz
*Attorney, Agent, or Firm*—Stevens, Davis, Miller & Mosher

[57] ABSTRACT

A one step rewinding system for automatically rewinding tape for magnetic tape recorders and reproducers is provided. The system is mechanically constructed and comprises the combination of two mechanisms respectively for changing a recording or playback condition to a rewinding condition by detecting the tensional change of the tape that is produced when it comes to the end and stretches out, and for terminating the whole system to return to the original or preoperated condition when the tape is rewound up to the end. According to such a system, a record or playback button and a rewind button are depressed together before starting a record or playback operation and the rewinding operation begins instantly after the termination of the former operation.

6 Claims, 8 Drawing Figures

ONE STEP REWINDING SYSTEM FOR MAGNETIC TAPE RECORDERS AND REPRODUCERS

BACKGROUND OF THE INVENTION

In general, magnetic tape recorders need two steps in changing recording or playback condition to rewinding condition. For example, an operator pushes a rewind button after returning of a record or playback button or after observing the sign indicating that tape has come to its end.

Recently, there have appeared a tape recorder having a mechanism which enables to effect these two steps electrically. Such a mechanism is operated by electrically detecting the termination of tape-running with a tensional arm and the like. However, the mechanism of a tape recorder having the system needs complicated means or elements since electric exchange is made once at the time of switching recording or playback operation to rewinding operation. If the mechanism is applied to a portable tape recorder supplied with an electric force from a battery, the consumption of electric current is very large so that the battery cannot be used long. Therefore a tape recorder with the mechanism costs high and it is not economical to use it in the portable tape recorder.

The present invention has been established for the purpose of obtaining a simple and automatic rewinding system which is free from drawbacks as described above.

SUMMARY OF THE PRESENT INVENTIONS

It is a primary object of the present invention to provide a one step rewinding system for rewinding automatically a tape for magnetic tape recorders and reproducers, which is devised wholly mechanically to make it possible to start rewinding a tape automatically at the same time when a recording or playback operation terminates by pushing or programing a rewind button together with a record or playback button before starting recording or playback operation.

The present invention comprises the combination of two mechanisms respectively for actuating a detecting lever, lock-releasing lever and other connecting parts in response to a tensional change generated when tape is taken up completely to a take-up pulley, so that those operating parts automatically return to a stop condition and then switches to a rewinding condition; and for returning a rewind lever to the original or pre-operation position and putting off an electric switch by causing a relay pulley arranged between a rewind pulley and idle pulley to be pulled upward with the termination of the rewind pulley when the tape is completely rewound to the rewind pulley. In further detail, the system according to the present invention has a power-transmitting assembly consisting of a fly-wheel driven by a drive belt connecting to motor means and a take-up pulley to transmit power from the fly-wheel to take-up reel table, a detecting lever to detect a tensional change of a tape, an eccentric-cam arranged coaxially with the fly-wheel and a lock-releasing lever, whereby the detecting lever is actuated in response to the tensional change of tape generated when it is completely taken up and then a lock-releasing lever is pushed down to lock to an eccentric-cam provided coaxially with the driving fly-wheel, and the lock-releasing lever is shifted so that the record or the playback lever is released from a pin of the lock-lever locking it and returns to the stop condition; at the same time, a rewinding operation occurs since the idle pulley transmitting power to the rewind pulley from the fly-wheel and the relay pulley are pushed to contact to the fly-wheel. When the tape is completely rewound up and therefore the rewind pulley stops its motion, the relay pulley connecting to the idle pulley that is transmitted power from the fly-wheel is pulled up together with its supporting lever in the rotating direction of the idle pulley and is parted from the idle pulley to receive no further driving power from it. As the supporting lever of the relay pulley is moved upward together with the relay pulley, the rewind lever is released from the pin of the lock-lever locking the rewind lever and retracted to the original position, whereupon an electric switch for actuating motor means is put off and the pullying-up action of the relay pulley due to the contact with the intermediate pulley is ceased, so that the whole mechanism returns automatically to the original or pre-operation condition.

The present invention will be understood more clearly from the following detailed description and accompanying drawings.

DETAILED DESCRIPTION OF THE INVENTION

Figure 1:
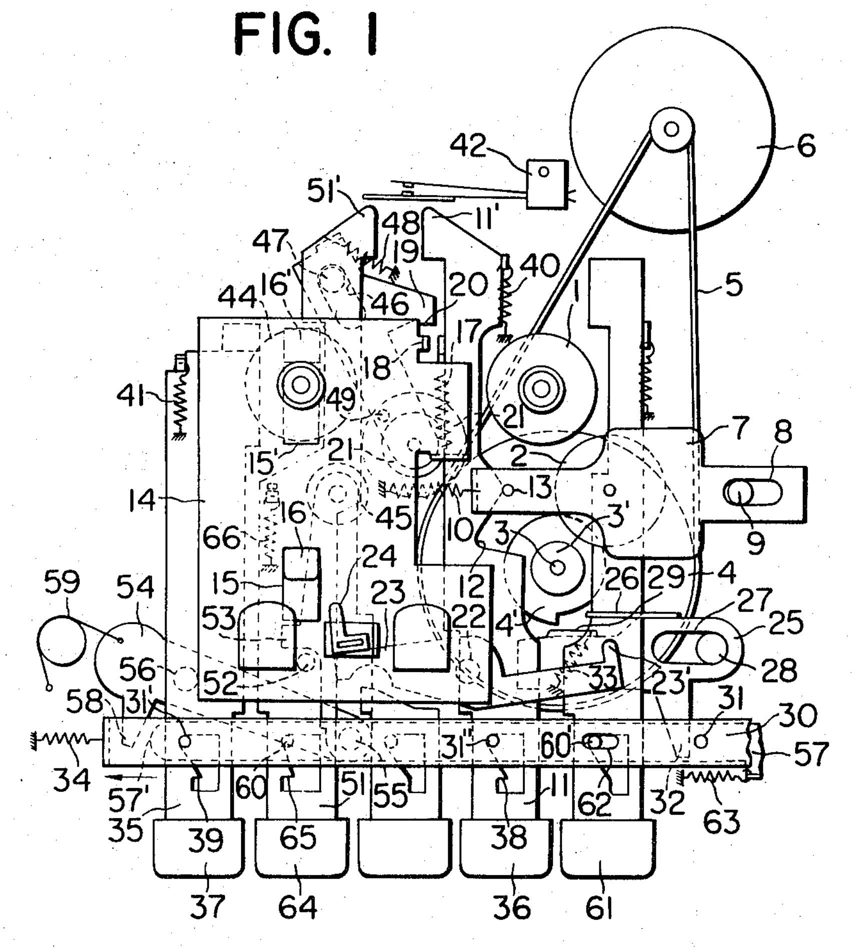
FIG. 1 is a plan view showing the essential parts in a termination state of one embodiment of the one step rewinding system according to the present invention.

Referring now to FIG. 1, a take-up reel table 1 is rotated by means of a power-transmitting assembly comprising a friction pulley (not shown) mounted frictionally on the same axis with the take-up reel table 1, take-up pulley 2 and a fly-wheel 4 arranged to contact with the take-up pulley 2 and provided with an eccentric-cam 4' and further with a capstan pulley 3' having an axial capstan 3, the fly-wheel 4 being connected with a drive belt 5 for transmitting power produced by motor means 6 to the fly-wheel 4, and the take-up pulley 2 is supported rotatably at the center of a take-up lever 7. One end of take-up lever 7 is formed with a lengthwise hole 8 into which axis 9 is inserted so that said lever 7 is supported movably. At the other end of said lever 7, a spring 10 is fixed to pull said lever 7 in one direction. Take-up lever 7 is further provided with a pin 13 which is slidingly connected to V-shaped notch 12 provided at the middle part of playback lever 11. The pin 13 comes into the V-shaped notch 12 during the playback operation and then take-up pulley 2 contacts to a friction pulley (not shown) mounted frictionally on the same axis with said rewind pulley 1 and capstan pulley 3, so that it transmits power produced at motor means 6 to take-up reel table 1. The numeral 14 indicates a sliding plate 14, which is provided with lengthwise holes 15, 15' into which supporting bars 16,

16′ is inserted to support said sliding plate 14 in such a way that said plate can move forward and backward. Under said sliding plate 14 is provided one end of spring 17, the other end being connected to playback lever 11 so that said sliding plate can slide when said playback lever 11 is pushed. At the back portion of said sliding plate 14, a projection 18 is provided in such a position that it connects with projection 20 of idle lever 19. During the playback operation, said projection 18 connects with projection 20 with the result that idle pulley 21 disconnects with fly-wheel 4 and therefore no further power is transmitted from said fly-wheel 4. At the front portion of said sliding plate 14, on the other hand, detecting lever 23 is supported rotatably with axis 22. Detecting liner 23 has a detecting plate 24 at its one edge portion to detect the tensional change of tape when it is taken up completely. The other edge portion of said detecting lever 23 is provided with a projection 23′ capable of engaging with the upperly-bended projecting plate 26 which is arranged on lock-releasing lever 25. Said lock-releasing lever 25 is formed with a lengthwise hole into which axis 28 is inserted so that said lever 25 may be supported movably. At the central side of said lock-releasing lever 25 is provided with a downwardly-bended projecting plate 29 so that said lock-releasing lever 25 can contact with eccentric-cam 4′ of said fly-wheel 4 due to the action of detecting plate 24 caused by the tensional change of the tape at the termination of playback operation. Further, at one edge portion of said lockreleasing lever 25 a projection 32 is provided corresponding to lock-pin 31 that is attached on lock-lever 30 which moves sideways to receive and lock only record and playback levers 35 and 11. And spring 33, being fixed on said downwardly-bended projecting plate 29, pulls said lock-lever 30 in one direction. Lock-pins 31′ and 31 for locking only record and playback levers 35 and 11 are fixed on aforesaid lock-lever 30. The edge portion of said lock-lever 30 is connected with a spring 34 which retracts said receiving lever 30 always in the arrow-marked direction. Playback lever 11 and record lever 35 have respectively hooks 38 and 39 which catch lock-pins 31′ and 31″ pushing playback and record push-buttons 36 and 37 which are provided at the frontal portions of playback and record levers 11 and 35. Also, playback lever 11 and record lever 35 are provided with returning springs 40 and 41 respectively and the top portion of said playback lever 11 is formed with projection 11′ for putting on an electric switch 42 for the motor 6.

Figure 2:
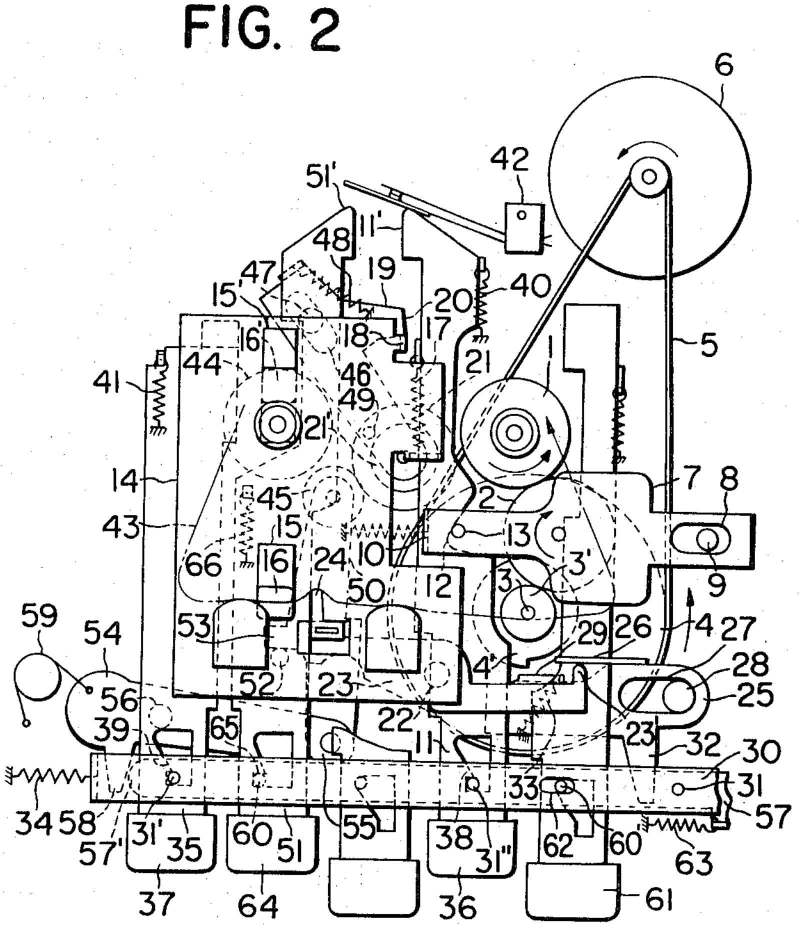
FIG. 2 is also a plan view showing the state where either record or playback button and rewind button are pushed together.

Next referring to FIG. 2, there is used a tape of the type with its end secured on tape-hub. By pushing record or playback button and rewind button altogether, lock-lever 30 is moved sideways so that lock-pins 31′ and 31″ on said lock-lever 30 lock to hooks 39 and 38 of record lever 35 and playback lever 11 and at the same sliding plate 14 is moved backward due to the force of spring 17. Successively, projection 18 of said sliding plate 14 hits upon and pushes projection 20 of idle lever 19 with the result that idle pulley 21 gets apart from fly-wheel 4 to cut off the transmission of power to idle pulley 21. Said take-up lever 7 is pulled and moved to the left by the force of spring 10 because pin 13 provided on take-up lever 7 comes down into V-shaped notch 12. Then take-up pulley 2 contacts with capstan pulley 3′ and friction pulley (not shown) which is arranged frictionally on the same axis with take-up reel table 1 and transmits the power to take-up reel table 1. Projection 11′ of playback lever 11 causes the electric switch 42 to close and activate motor 6. Drive belt 5 is therefore driven and axial capstan 3 of fly-wheel 4 and pinch-roller (not shown) pressed tightly to said capstan 3 are caused to rotate so that tape 43 is pulled out and wound up on to take-up reel table 1.

Figure 3:
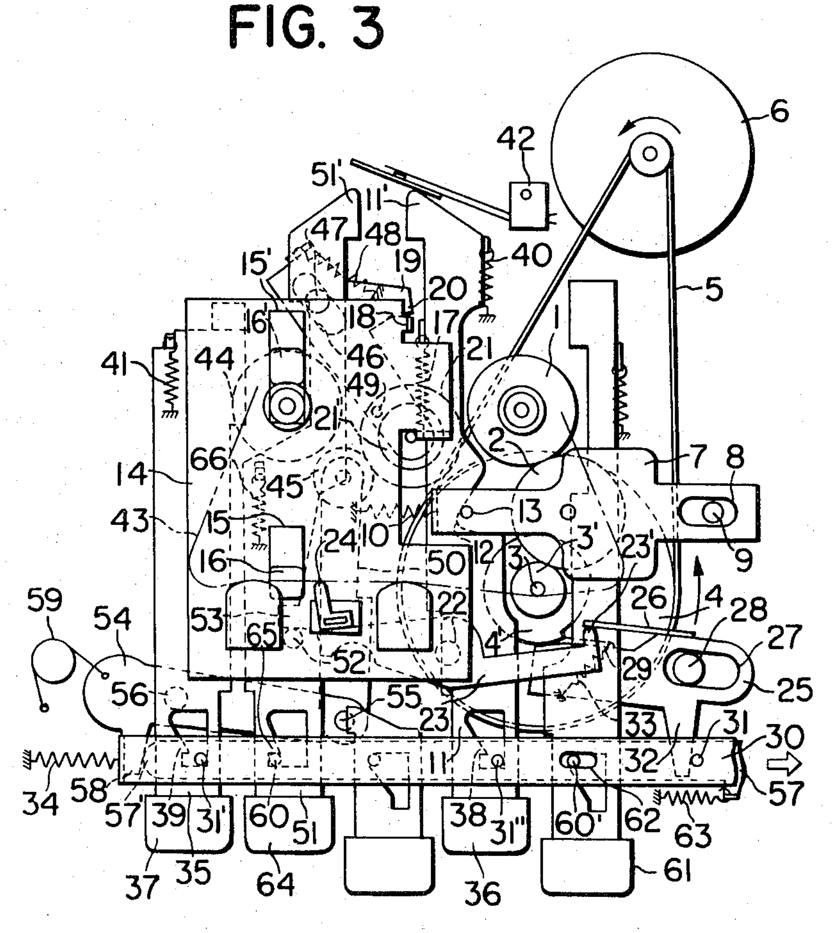
FIGS. 3 and 4 are explanatory views showing the operation condition of the system as illustrated in FIG. 1.
Figure 4:
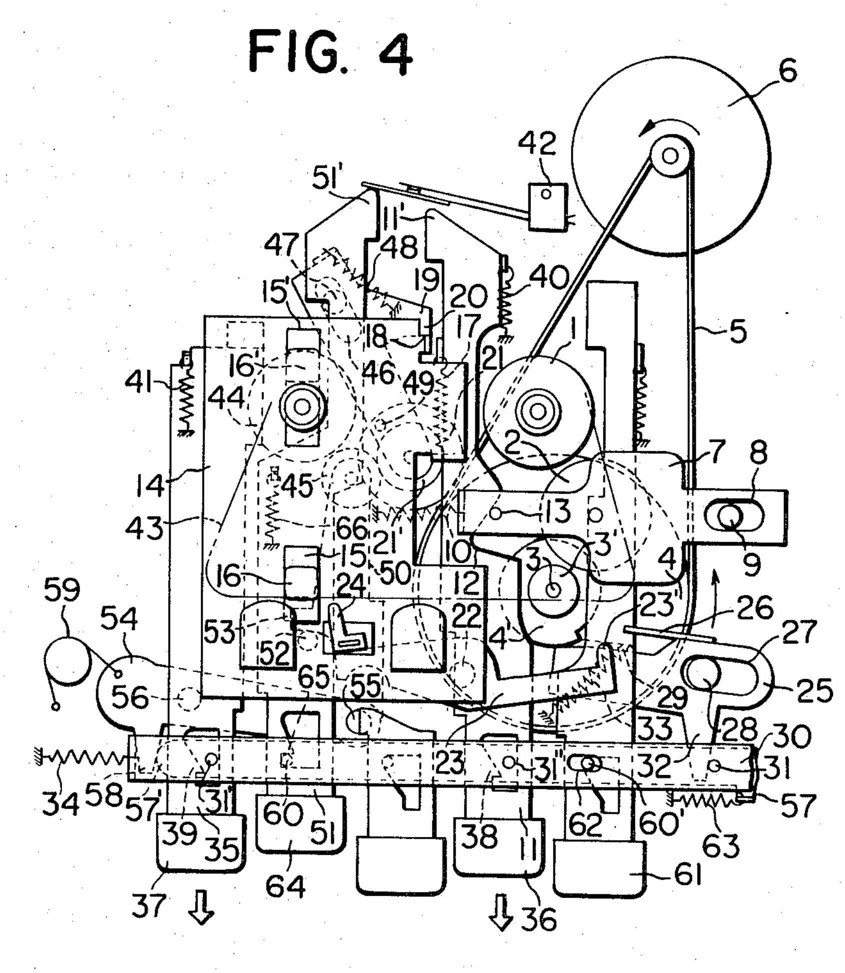

When tape 43 is completely wound up and stops to run as shown in FIG. 3, the detecting plate 24 provided at the left side of detecting lever 23 catches the tensional change of tape 43 and pivots about axis 22 so that projection 23′ at the right of detecting lever 23 pushes up upwardly-bended projecting plate 26 of lock-releasing lever 25 and then causes downwardly-bended projecting plate 29 to lock to eccentric-cam 4′ of rotating fly-wheel 4. Due to the rotation of fly-wheel 4, lock-releasing lever 25 moves towards right and projection 32 provided at the side of said lock-releasing lever pushes lock-pin 31 and therefore lock-lever 30 to the right as shown in FIG. 3, so that left lock-pins 31′ and 31′ of said lever 30 are released from hooks 38 and 39 of record and playback levers 35 and 11 respectively, which return to the original or pre-operation state by the force of returning springs 41 and 40 as shown in FIG. 4.

However, rewind push-button 64 is previously pushed on for a successive tape rewinding operation, electric switch 42 is kept closed with the top portion 51 of rewind lever 51, and fly-wheel 4 is still driven by drive belt 5 so that the operation turns to a rewinding operation.

Figure 5:
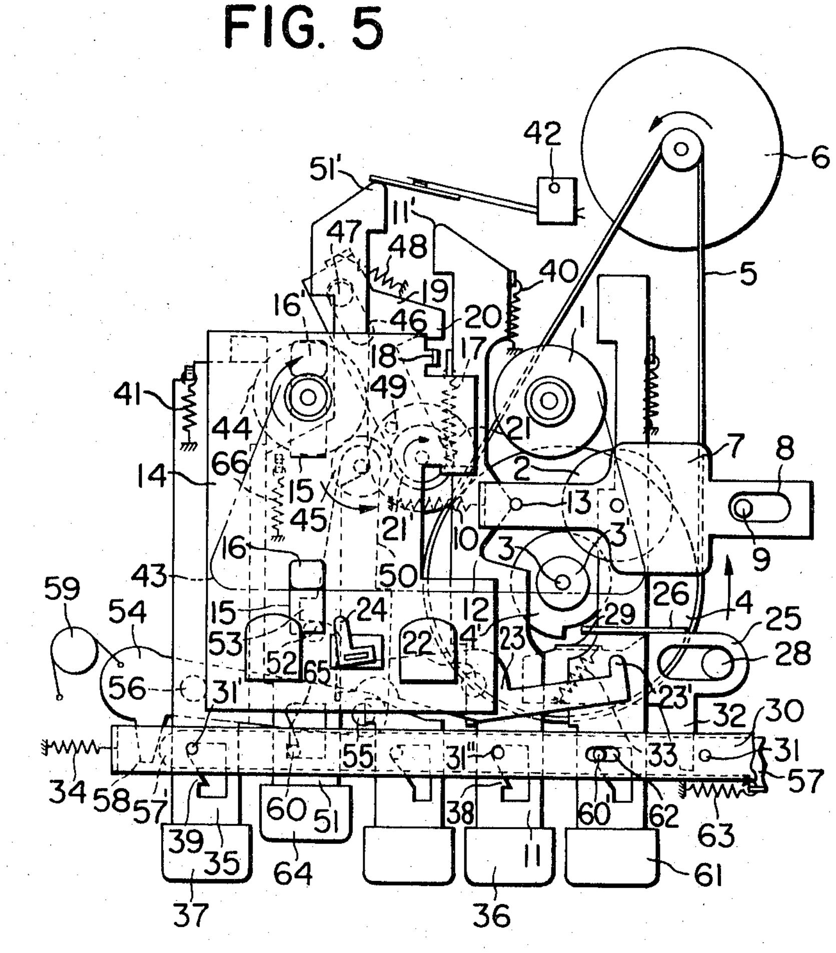
FIG. 5 is a plan view showing the rewind condition of the system as illustrated in FIG. 1.

Explaining more clearly in FIG. 5, rewind pulley 44 is devised to rotate by receiving power from relay pulley 45 and intermediate pulley 21 coaxial with idle pulley 21 and fly-wheel 4 contacting with said idle pulley 21. And idle pulley 21 is supported rotatably on one end portion of idle lever 19. At the other end of said idle lever 19 is formed a lengthwise hole 46 into which axis 47 is inserted to support said idle lever 19 in freely-movable condition. And said idle lever 19 is retracted in one direction by the force of spring 48 fixed on frontal portion thereof. Also idle lever 19 is fixed with a pin 49 in such a position that said pin 49 receives said relay pulley 45 near intermediate pulley 21′. Said relay pulley 45 is supported rotatably at the top portion of relay pulley lever 50. The central portion of said lever 50 is formed with a projection 53 which can contact with pin 52 fixed under rewind lever 51. The other end of said relay pulley lever 50 is connected to the end portion of a movable arm 54 through a pin 55. Said movable arm 54 is supported movably by axis 56. One end of said movable arm 54 is provided with a projection 58 corresponding to edge portion 57′ of lock-lever 57 which is arranged under another lock-lever 30 to slide along it. The top portion of said movable arm 54 is attached with a spring 59 whose equilibrium varies.

As illustrated in FIG. 5, lock-pins 60 and 60′ for locking rewind-lever, termination lever and other levers are fixed on lock-lever 57 under lock-pin 31′ and 31″ to lock record and playback levers which are fixed to said lock-lever 30. According to such an arrangement, pushing termination-button 54 moves lock-pin 60′ so that the top portion of pin 60′ hits upon lengthwise hole 62 to make lock-lever 57 slide sideways. Further, at the end of said lock-lever 57, spring 63 is provided for retracting said lever 57 in the arrow-marked direction shown in FIG. 1. Said rewind lever 51 has hook 65 which locks to lock-pin 60 by pushing rewind button 64 provided at the front edge of said rewind lever 51. Further, said rewind lever 51 is attached with a returning spring 66 and its top portion is formed with a projection 51' for switching on electric switch 72 for actuating the motor 6.

As rewind push-button 64 is previously pushed or programmed when the record lever 35 or playback lever 11 are pushed, top portion 51' of rewind lever 51 subsequently closes and keeps electric switch 42 for motor means 6 on, rewind pulley 44 begins to rotate in the arrow-marked direction through fly-wheel 4, idle pulley 21, intermediate pulley 21' and relay pulley 45 so that tape 43 is rewound.

Spring 59 is provided at the top portion of said movable arm 54 in such a tensional strength that relay pulley 45 at the top portion of relay pulley lever 50 connecting to said movable lever 54 will not be pulled in by rotating idle pulley 21 and intermediate pulley 21' mounted coaxially with said idle pulley 21 during the rewinding operation.

Figure 6:
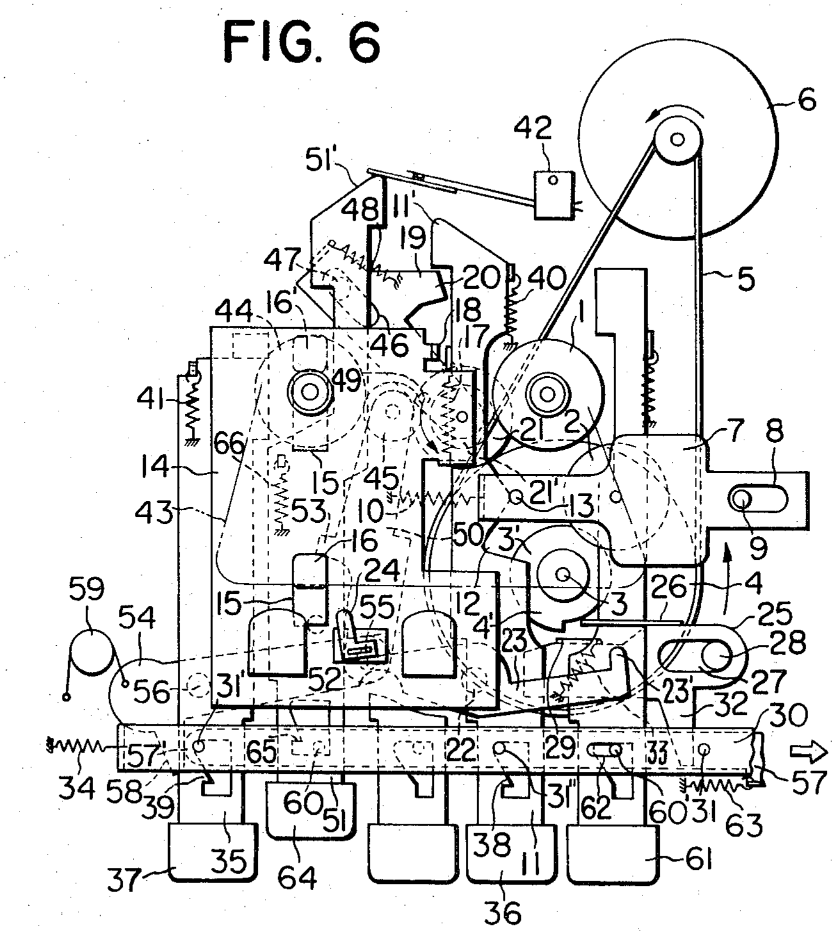
FIG. 6 and 7 are explanatory views of the operation condition of the system as illustrated in FIG. 1.

When tape 43 is completely rewound, and rewind pulley 44 stops its movement, relay pulley 45 connecting to intermediate pulley 21' coaxial with idle pulley 21 also stops rotating but is pulled in the rotating direction as shown in FIG. 6 because said relay pulley 45 is driven with fly-wheel 4. At the time of this operation, lever 50 supporting relay pulley 45 is moved upward to pull up and turn, at the pivot of axis 5, movable arm 54 connecting to the end of said lever 50 so that spring 59 attached at the end portion of said movable arm 54 changes its position and takes an action in such a way as to pull up said relay pulley 45. Therefore, relay pulley 45 is easily pulled up until it hits upon and pushes pin 49 provided on idle lever 19. Accordingly, idle lever 19 is moved aside by the force of spring 48, and relay pulley 45 parts from intermediate pulley 21' provided coaxially with idle pulley 21 which is driven through fly-wheel 4 and gets free from transmission of power from said idle pulley 21, in other words, stops its rotating movement.

When relay pulley 45 is pulled up as stated above, movable arm 54 pivots about axis 56 as shown in FIG. 6 and then projection 58 provided at the side of said movable arm 54 pushes the end portion 57' of lock-lever 57 to the right. Then lock-pin 69 fixed on said lock-lever 57 is released from hook 65 of rewind lever 51 and therefore said rewind lever 51 is pulled back to the original or pre-operating state by the force of returning spring 66.

When rewind lever 51 returns back, pin 52 provided on rewind lever 51 contacts to movable arm 54 and pulls it back.

Figures 7, 8:
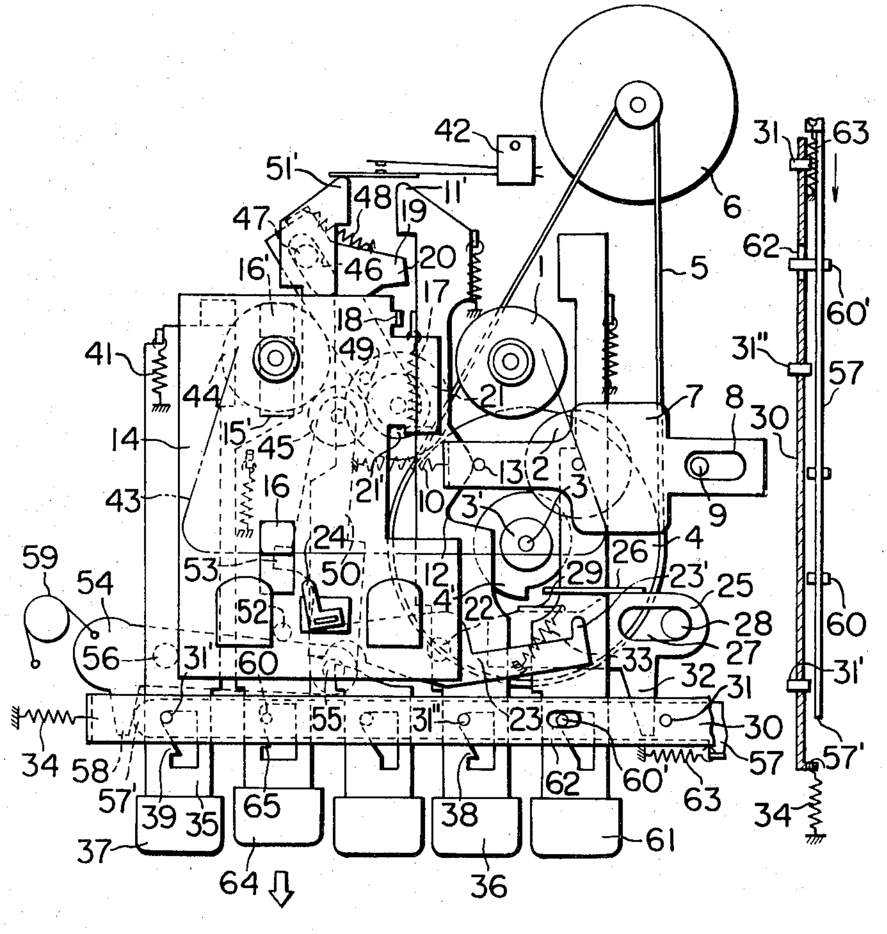
FIG. 8 is a side view showing the relationship between lock-lever and lock-pin in the essential parts of the system according to the present invention.

In this step, top projection 51' of rewind lever 51, as shown in FIG. 7, detaches from electric switch 42 to open it and then motor 6 is stopped, so that pulling-up action of relay pulley 21 due to the contact with intermediate pulley 21' of idle pulley 21 is ceased and therefore said relay pulley 21 is pulled back with returning spring 66 to the original position. Then the whole system comes back automatically to the original state as shown in FIG. 1.

As understood from the above description, magnetic tape recorders and reproducers incorporating the one step rewinding system according to the present invention enables to make take-up and rewind operations in one step without employing any electric mechanism as stated in the Background of the Invention and therefore can retain the life of motor as well as battery long.

What we claim is:

1. An apparatus for the automatic rewinding of a tape recorder and reproducer tape after complete unwinding of the tape, and for the automatic termination of the rewinding operation after complete rewinding of the tape, said apparatus comprising:

a rewind drum from which the tape is unwound during a recording or reproducing operation and onto which tape is wound during the rewinding operation, a take-up reel onto which the tape is wound as it is unwound from the rewind drum and from which the tape is unwound as it wound onto the rewind drum.

a flywheel for transmitting power from a motor to said take-up reel and said rewind drum, a cam on said flywheel, a releasing lever, a projection on said releasing lever, said releasing lever being engageable with said cam of said flywheel, recording and reproducing control arms, the actuation of either of said arms effecting an unwinding of said tape from said rewind drum, means for locking each of said arms in an actuated position, said locking means being engageable with said projection on said releasing lever for releasing said locking means to return either one of said arms which is actuated to a non-actuated position, a detecting lever, said detecting lever being pivoted by the tape, after complete unwinding of the tape from the rewind drum, into engagement with said releasing lever, whereby upon pivoting of the detecting lever by the tape, said detecting lever engages said releasing lever and moves said releasing lever into engagement with said cam of said flywheel and the locking means of each of the arms is released by engagement thereof with said projection of said releasing lever, a relay lever, a relay pulley on said relay lever, said relay pulley drivingly connecting said flywheel and said rewind drum during tape rewinding onto said rewind drum, a rewind arm, means for locking said rewind arm in an actuated position, said rewind arm being adapted to be actuated substantially simultaneously with the actuation of either one of the unwinding arms, and said relay pulley being movable in response to the difference in circumferential speed arising between the input from the flywheel and the output to the rewind drum after the rewind drum has stopped rotation with the rewound tape thereon for releasing the locking means of the rewind arm to return said rewind arm to a non-actuated position.

2. The apparatus as claimed in claim 1 wherein:

one end of said detecting lever abuts against the tape, a projection on the other end of said detecting lever, an upwardly bent projecting plate on said releasing lever, a downwardly bent plate on said releasing lever, and said projection on said detecting lever is engageable with said upwardly bent projecting plate for moving said downwardly bent plate into engagement with the cam on the flywheel.

3. The apparatus as claimed in claim 1 further comprising:

a pivotable intermediate lever, a stop pin disposed on said intermediate lever, said stop pin being adapted to interrupt the movement of said relay pulley, an arm connected to said relay lever, an electrical switch for controlling the operation of said motor, a pin on said rewind arm, and said pin on said rewind arm is adapted to contact and move the arm connected to the rewind lever after said electrical switch has been switched off.

4. The apparatus as claimed in claim 3 further comprising:

a first idle pulley, a second idle pulley arranged coaxially with said first pulley, said first and second idle pulleys being rotatably mounted on one end of said pivotable intermediate lever, and a spring biasing said pivotable intermediate lever.

5. The apparatus as claimed in claim 1 further comprising:

a projection on the central region of said relay lever, a pin on the rewind arm, said relay lever projection being adapted to be engaged with said pin, a movable arm, a projection on said movable arm, one end of said relay lever being connected to said movable arm, said locking means for the rewind arm comprising a locking lever, and said arm projection being adapted to coact with said locking lever.

6. The apparatus as claimed in claim 1 wherein:

the locking means of the unwinding arms comprises a first lock lever, a spring biasing said lock lever, a first pin on the lock lever, a second pin on the lock lever adapted to engage in a notch on said recording arm, and a third pin on the lock lever adapted to engage in a notch on said reproducing arm, said first pin on the lock lever of said unwinding arms being engageable with said projection on said releasing lever, said locking means of said rewind arm comprises a second lock lever, a spring biasing said second lock lever and a pin on said second lock lever adapted to engage in a notch on said rewind arm, and a movable arm, and a projection on said movable arm adapted to engage an edge portion of said second lock lever and thereby move said second lock lever for releasing the locking means of the rewind arm.

* * * * *